United States Patent [19]

Savron

[11] 4,084,655
[45] Apr. 18, 1978

[54] MOTOR VEHICLES

[76] Inventor: Emil Savron, 468 Morphett Road, Warradale, Australia, 5046

[21] Appl. No.: 713,100

[22] Filed: Aug. 10, 1976

[30] Foreign Application Priority Data

Aug. 15, 1975 Australia .............................. 2802/75

[51] Int. Cl.² .............................................. B62D 25/20
[52] U.S. Cl. .................................. 180/69.1; 184/106; 296/38
[58] Field of Search ........................ 180/69.1; 296/38; 184/106

[56] References Cited

U.S. PATENT DOCUMENTS

| 2,868,329 | 1/1959 | Phelps | 180/69.1 |
| 2,931,453 | 4/1960 | Inglese | 180/69.1 |
| 3,169,605 | 2/1965 | Ashmead | 180/69.1 |
| 3,316,995 | 5/1967 | Fay | 180/69.1 |
| 3,329,231 | 7/1967 | Takenouchi | 180/69.1 |
| 3,454,124 | 7/1969 | Niedek | 180/69.1 |
| 3,482,642 | 12/1969 | Andrews | 180/69.1 |
| 3,980,153 | 9/1976 | Andrews | 180/69.1 |

*Primary Examiner*—David M. Mitchell
*Attorney, Agent, or Firm*—Oldham, Oldham, Hudak & Weber

[57] ABSTRACT

A vehicle having an internal combustion engine with a drip tray to collect exudate, the tray being adjustably secured beneath the engine and arranged so as to allow cooling air to pass between the engine and the tray, the position of the tray being adjustable to allow access for maintenance of the engine or removal of sump oil, and the tray preferably having means such as an absorbent pad therewith to stop undue splashing of liquids within the tray.

3 Claims, 3 Drawing Figures

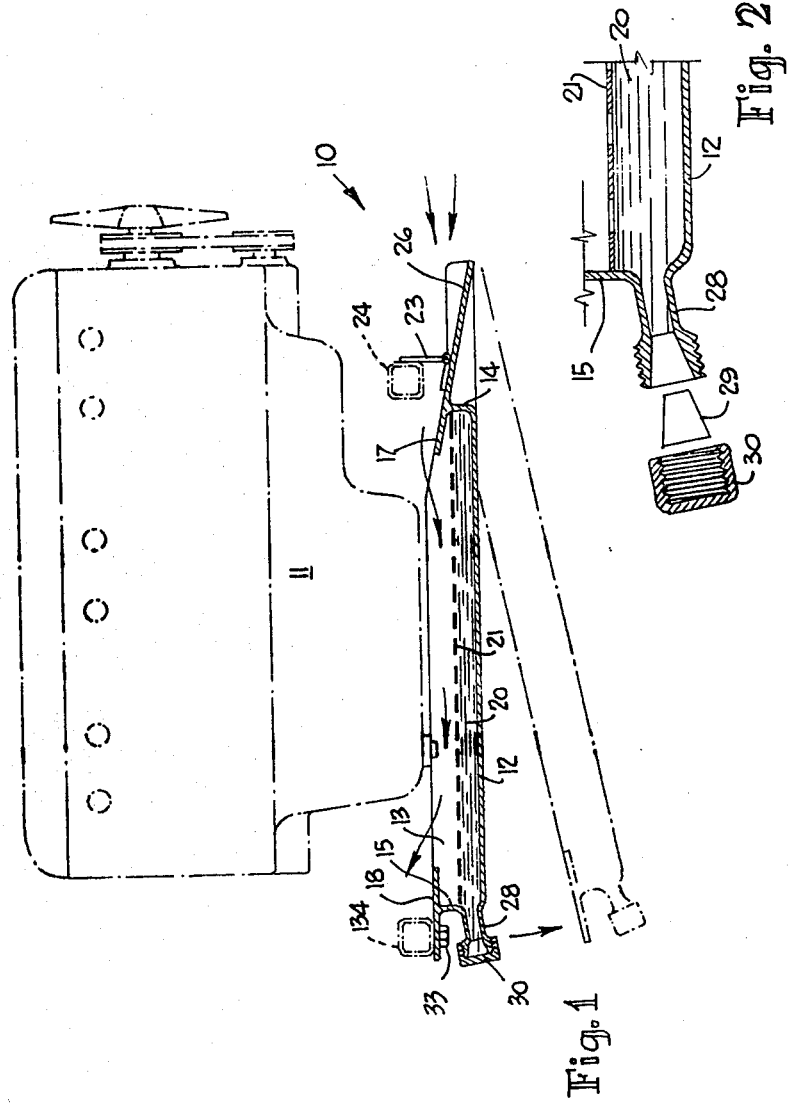

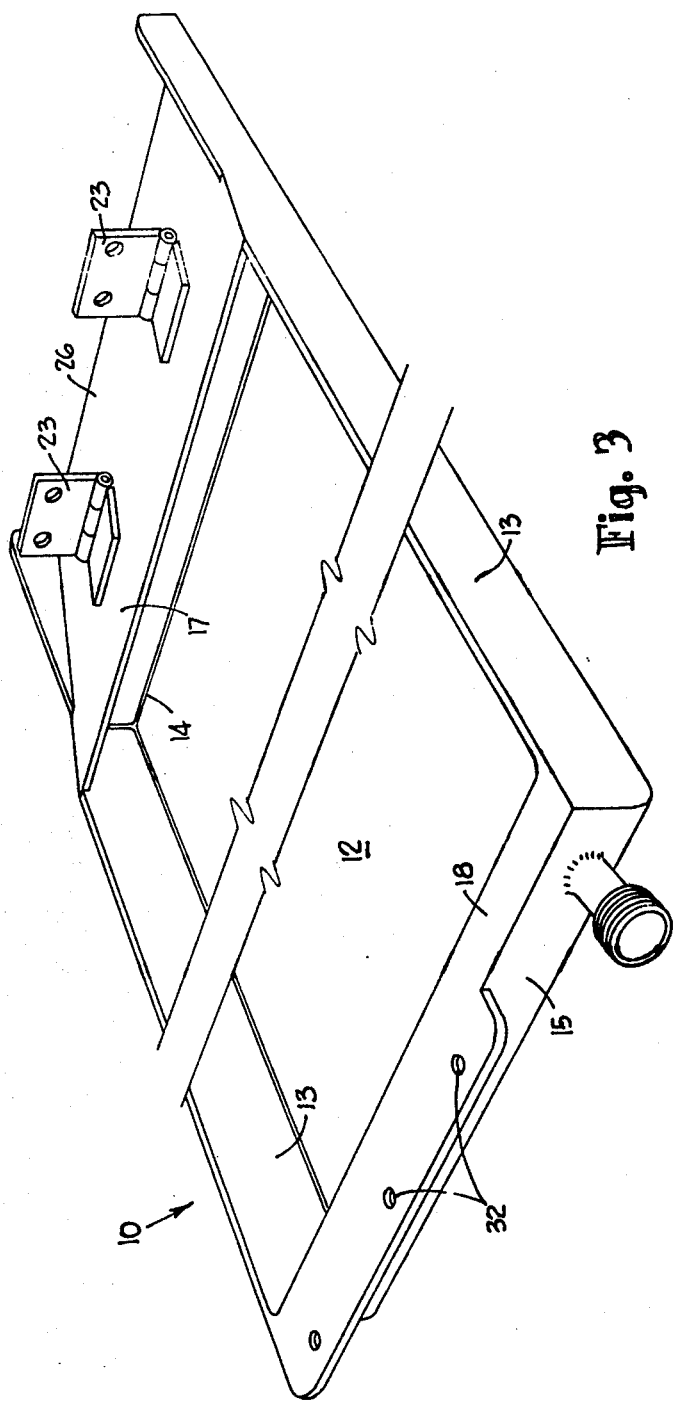

MOTOR VEHICLES

This invention relates to moter vehicles and in particular those having internal combustion engines which are found to exude oil from time to time by reason of leakage from the engine.

It is a well known problem that most internal combustion engines exude oil and this is conventionally allowed to drip either onto a road over which the vehicle is passing or onto the floor over which the vehicle is situated for instance in a garage or in some parking position.

It is known to provide a drip tray on a floor over which the vehicle engine is normally housed but this does not remove the problem that the engine will still drip oil when proceeding along a road or in a parking position either alongside a road or in some parking station, and the oil besides being unsightly can also provide a slippery surface which can be regarded as substantially dangerous.

It will be appreciated that the build-up of oil on road surfaces after some period of time will reach the stage where the oil will spread, be picked up by the tyres of other vehicles and generally provide both dangerous and unsightly conditions.

This invention is directed toward this general problem.

According to one form of the invention, it is proposed that this comprise a vehicle with an internal combustion engine drive characterised in that positioned beneath the said engine in spaced apart relationship thereto is a tray adapted by reason of size and positioned to collect and retain drips of oil or other liquids referred to generally as exudates as will normally drip from an internal combustion engine.

The concept then is that there is provided a tray which will be fitted below the internal combustion engine and, it is conceived, sufficiently below so as to allow air to pass between the tray and the underneath side of the engine whereas not to impede cooling of the engine oil by reason of this air passing the casing of the engine and that this tray therefore travel with the car so as to ensure complete collection of all the exudates from the engine.

Numerous difficulties purely on the mechanical side still face this general proposal and a first of these is in relation to the problem of access for instance draining sump oil when the engine oil must be drained and furthermore of irregularly gaining access to the tray so as to ensure removal of oil or other exudates as these build up.

Accordingly there is proposed a feature that the tray be secured so that it can assume at least two positions one of which is a collection position and a second of which is a position which will facilitate removal of the liquid exudates and also provide access to the underneath of the engine.

It has been found that it is of advantage to provide a pivotal support the pivot access being substantially horizontal at a forward end of the tray this secured to the vehicle in some suitable manner preferably a cross stay of the vehicle frame and that the rear of the tray be releasably secured so that it can be held in the collection position which would normally be a generally horizontal position or released so that the lower end is substantially lower which would normally be a ground engaging position of the rear end by which access to the underneath of the engine can be achieved and furthermore because of the substantial incline of the tray, exudates will flow from the tray into a collection vessel.

It has been found to be a substantial feature to provide a scoop like shape either inherently in the shape of the tray or by reason of an attached cowling which can be either attached or removed and at least where the shape is inherent in the tray, this is achieved by providing that a forward edge of the tray is lowermost rising in streamlined manner at least substantially so, to a rearward edge by which air is in effect scooped and caused to flow over the tray when the vehicle is moving forwardly.

One of the obvious difficulties with an arrangement as described, is the fact that when there is a substantial volume of exudates within the tray, these may tend to splash within the tray and therefore spill out onto a road or other surface.

It is therefore a feature that the tray shall be shaped around its periphery so as to provide retaining means for exudates within the tray and this is preferred to be in the form of an upturned and in turned shape which can have the effect of reducing overlapping of exudates and furthermore it has been found to be of substantial value to provide a fibrous mat or other absorbent material in mat form located across the floor of the tray which will absorb and hold in absorbed and retained manner liquid exudates.

The abosorbent material can in itself be held by suitable means to the tray and preferably internally within the tray and this has been found to be advantageously achieved by providing hooks secured to the floor of the tray around which the absorbent material is located and engaged.

Excess exudates can also be drained off at least in one form of the invention in which there is a rearward outlet aperture which is closable so that even without releasing the tray, this outlet aperture can be opened and the liquid exudate can be drained off in simple manner.

The manner in which a tray can be most conveniently secured not only to one particular model of vehicle but to many types of vehicles has been the result of substantial study, and it has been found that the most advantageous method is to provide two spaced apart forwardly positioned hinge members each having two leaves and being joined by a pin such that the axis of location around the pivot joint is at least when positioned beneath the engine of a motor vehicle, horizontal or substantially horizontal.

It is intended that the upper part of the leaf of the hinge be secured either by bolts or other reasonably permanent although releasable manner to a cross stay which is normally found in most vehicles.

By providing adequate size of tray, any normal engine of a vehicle can be substantially kept from leaving its liquid exudates on the ground.

Other features of the invention will be appreciated by a description of a preferred embodiment which shall now be given with the assistance of drawings in which, FIG. 1 is a sectional view showing a tray secured beneath an engine which is an internal combustion engine as would normally be located within a vehicle, FIG. 2 is an enlarged sectional view showing the rearward outlet aperture, and FIG. 3 is a perspective view of the tray according to this first preferred embodiment before being fitted beneath the engine.

Accordingly the preferred embodiment includes a tray 10 which is located beneath an internal combustion engine 11 in spaced apart relationship thereto so that air as shown by illustrative arrows in FIG. 1, can pass effectively between the tray 10 and the engine 11 to effect useful cooling thereby.

The tray 10 has a base portion which acts as a floor 12 and there are sides 13 extending around the periphery these being referred to at the forward end as 14 and the rearward end as 15 so as to provide a dish shape and there being a return or inwardly directed flange portion 17 and 18 to restrict splashing of liquid exudates while the vehicle is in motion.

Within the tray 10, there is a sheet or pad 20 of absorbent material which has been found to most usefully be made from an underfelt which is simply a matted fibrous material. The fibrous mat is held at least in the centre of the floor 12 by hooks secured at their lower end to the floor and extending out and over so as to engage the fibre material and hold this from being lifted and removed by any air suction effects. (The hooks are not shown in the drawing although the feature of a perforate sheet 21 of metal being held over the fibrous pad material is shown.

The return flange 17 of the forward side 14 is shaped so as to have a forward lower edge and a rearward rising higher edge connected by a shelf 26 that is shaped so as to provide mainly streamlined flow thereover for air passing thereby and this in effect provides a scooping effect for air.

Secured to the upper face of this wall are two hinges 23 spaced apart and having one hasp in each case secured to the wall and the second secured to a cross member 24 of the vehicle to which the tray is fitted.

At the rearward edge of the tray 10, there is an outlet aperture 28 which is closable by means of a bung 29 which is constituted by being made from synthetic rubber and this is held securely in place by a screw threaded tap 30 which engages a male thread on a projecting portion of the aperture 28.

Extending rearwardly of the rear wall 15 is a rearwardly extending shelf through which apertures 32 pass by which bolts 33 can extend and adjustably hold the rearward end of the tray in the position secured to cross bar 134, as shown in FIG. 1 which is a collection position although it will be seen that there is also the emptying position which can be as shown in dotted lines also in FIG. 1.

In use, liquid exudates as will be collected by the tray while in the collection position will be retained by the porous mat until the operator decides that these should be emptied, and in that event, he will release by undoing the bolt 33 the rear of the tray 10 which will then rotate about the forward pivotal axis and he can then either draw off the liquid exudates through the outlet aperture at the rear or additionally remove the underfelt material by lifting away the metal retaining member or pulling this underfelt away from retaining hooks and removing the liquid exudates such as oil in conventional manner perhaps by squeezing this or replacing the underfelt with new material.

Subsequently by restoring the tray to its original collection position, the vehicle is then ready to proceed in normal manner.

It will be seen that by use of the forward pivot connection, in the event that accidentally the releasable holding means such as the bolts 33 did come undone, the result would simply be that that end of the tray would fall to the ground and apart from some slight abrasive damage that might occur, the position could be very quickly repaired without excess damage either to the vehicle or to the tray.

Furthermore, access to the underneath side of the sump of the engine 11 is quite adequate and indeed, the existence of a tray of the type described can assist in the removal of sump oil where this is desired. This is achieved by allowing the sump oil to pass into the tray and then simply having the outlet aperture concentrate the flow and receiving the flow from the outlet aperture 28 into a vessel of suitable type.

While reference has been made to the position of the tray being underneath the internal combustion engine, it will be appreciated that by a slight extension of the length, it can fit under the normally attached gear box retained behind the engine where this might be causing some troublesome exudates.

It will be seen that the proposal provides substantial advantage by removing random loss of oil or other liquid exudates from an internal combustion engine and this is done regardless of whether the vehicle is moving or otherwise and indeed there is little disadvantage in installing the tray as shown and in some instances there can be substantial separate advantage from the mere collection of the exudates such as assisting in concentrating of air flow below the engine and also assisting in the removal of sump oil.

I claim:

1. Apparatus for collecting and retaining liquid exudant such as oil as dripped from an internal combustion engine of a vehicle, the arrangement being characterized in that there is a tray, including a floor and upturned sides and a rear portion, adapted to be supported by being secured to the vehicle in a position below the engine, the position of the tray relative to the motor vehicle being such as to encourage air flow between the engine sump and the tray during forward movement of the motor vehicle, the tray being adapted to retain the liquid exudant by reason of the upturned sides, a porous pad within the tray extending over the floor of the tray, means retaining said pad in such position within the tray, hinge means secured to a front portion of the tray to secure the tray to a vehicle below the engine to mount the tray pivotally for movement between a horizontal drip catching position and a downwardly extending draining position, an outlet means at a rear portion of the tray for draining liquid collecting in the tray, and removable means to secure the rear portion of the tray to a vehicle to position the tray substantially horizontally.

2. Apparatus for collecting and retaining liquid exudant such as oil as dripped from an internal combustion engine of a vehicle, the arrangement being characterized in that there is a tray, including a substantially flat floor and upturned sides and a rear portion, adapted to be supported by being secured to the vehicle in a position below the engine, the position of the tray relative to the motor vehicle being such as to encourage air flow between the engine sump and the tray during forward movement of the motor vehicle, the tray being adapted to retain the liquid exudant by reason of the upturned sides, hinge means secured to a front portion of the tray to secure the tray to a vehicle below the engine to mount the tray pivotally for movement between a horizontal drip catching position and a downwardly extending draining position, a normally closed outlet means at a rear lower portion of the tray for draining liquid collecting in the tray, and removable means to secure the rear portion of the tray to a vehicle to position the tray substantially horizontally.

3. Apparatus as in claim 2 where the tray has side walls extending therearound, the forward one of said side walls having a top flange extending forwardly and downwardly at an angle acute to said forward side wall to serve as a streamlining air deflector to deflect air to flow up over the tray to provide air cooling of an associated internal combustion engine; the tray being flat and having an open unobstructed top to facilitate air flow between the tray and the bottom of an engine with which the tray is associated; the rearward said side wall has a flange extending forwardly and rearwardly therefrom at an angle substantially normal to said rear side wall, an extension flange on said tray on its said forward side wall extending rearwardly therefrom, a porous pad within the tray extending over the floor of the tray, and a cover screen retained on the pad on said tray by said front and rear wall flanges.

* * * * *